(12) United States Patent  
Ohuchi et al.

(10) Patent No.: US 8,117,914 B2  
(45) Date of Patent: Feb. 21, 2012

(54) INERTIA FORCE SENSOR AND COMPOSITE SENSOR FOR DETECTING INERTIA FORCE

(75) Inventors: Satoshi Ohuchi, Hyogo (JP); Hiroyuki Aizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 12/527,141

(22) PCT Filed: Feb. 19, 2008

(86) PCT No.: PCT/JP2008/000251  
§ 371 (c)(1),  
(2), (4) Date: Aug. 13, 2009

(87) PCT Pub. No.: WO2008/102535  
PCT Pub. Date: Aug. 28, 2008

(65) Prior Publication Data  
US 2010/0071468 A1 Mar. 25, 2010

(30) Foreign Application Priority Data

Feb. 20, 2007 (JP) ................................. 2007-038992  
Mar. 19, 2007 (JP) ................................. 2007-070160

(51) Int. Cl.  
*G01P 15/08* (2006.01)  
*G01P 9/00* (2006.01)  
*G01P 3/44* (2006.01)  
*G01C 19/00* (2006.01)

(52) U.S. Cl. .................................................. 73/504.12
(58) Field of Classification Search ............... 73/504.12, 73/514.32  
See application file for complete search history.

(56) References Cited

U.S. PATENT DOCUMENTS

| | | | | |
|---|---|---|---|---|
| 5,415,040 A | * | 5/1995 | Nottmeyer | 73/514.02 |
| 5,567,880 A | * | 10/1996 | Yokota et al. | 73/514.33 |
| 6,082,197 A | * | 7/2000 | Mizuno et al. | 73/514.36 |
| 6,698,292 B2 | * | 3/2004 | Kikuchi | 73/662 |
| 7,188,525 B2 | * | 3/2007 | Machida et al. | 73/504.16 |
| 2003/0066350 A1 | * | 4/2003 | Machida et al. | 73/504.15 |
| 2006/0107739 A1 | * | 5/2006 | Ogura | 73/504.12 |
| 2009/0266163 A1 | * | 10/2009 | Ohuchi et al. | 73/504.12 |

(Continued)

FOREIGN PATENT DOCUMENTS

| | | | |
|---|---|---|---|
| JP | 05264577 A | * | 10/1993 |
| JP | 08-304450 A | | 11/1996 |
| JP | 10-048243 A | | 2/1998 |
| JP | 10-089968 A | | 4/1998 |

(Continued)

OTHER PUBLICATIONS

International Search Report for PCT/JP2008/000251, Apr. 30, 2008.

*Primary Examiner* — Lisa Caputo  
*Assistant Examiner* — Jamel Williams  
(74) *Attorney, Agent, or Firm* — Pearne & Gordon LLP

(57) ABSTRACT

An inertia force sensor includes a detection element having an acceleration detection section (1). This detection element (1) has: two orthogonal arms obtained by connecting first arms (8) to second arms (10) so as to be orthogonal to each other, a support section (12) for supporting one ends of the two first arm (8), a fixation section (4) connected to the other ends of the two first arms (8), and weight sections (2) fixed to tip ends of the second arms (10). The first arm (8) has a thickness thinner than thicknesses of the second arm (10) and weight section (2) to thereby provide an increased detection sensitivity.

12 Claims, 11 Drawing Sheets

U.S. PATENT DOCUMENTS

| | | |
|---|---|---|
| 2010/0071468 A1* | 3/2010 | Ohuchi et al. ............. 73/504.12 |
| 2010/0107764 A1* | 5/2010 | Uemura et al. ............. 73/514.32 |
| 2010/0199761 A1* | 8/2010 | Uemura ..................... 73/504.12 |
| 2010/0218604 A1* | 9/2010 | Terada ....................... 73/504.12 |
| 2010/0229645 A1* | 9/2010 | Aizawa et al. ............. 73/504.12 |

FOREIGN PATENT DOCUMENTS

| | | |
|---|---|---|
| JP | 2001-050751 A | 2/2001 |
| JP | 2001-208546 A | 8/2001 |
| JP | 2003-057263 A | 2/2003 |
| JP | 2001-82963 A | 3/2003 |

* cited by examiner (Driving vibration direction)
(Coriolis direction) (Coriolis direction)
(Driving vibration direction)
(Coriolis direction) (Coriolis direction)
(Driving vibration direction) (Driving vibration direction)

US 8,117,914 B2

INERTIA FORCE SENSOR AND COMPOSITE SENSOR FOR DETECTING INERTIA FORCE

TECHNICAL FIELD

The present invention relates to an inertia force sensor and a composite inertia force sensor used for various electronic devices for the posture control and navigation of a movable body such as an aircraft, an automobile, a robot, a ship, or a vehicle.

BACKGROUND ART

Hereinafter, an acceleration sensor, one of conventional inertia force sensors, will be described with reference to the technique disclosed in Patent Publication 1.

FIG. 15 is a top view illustrating a detection element of a conventional acceleration sensor disclosed in Patent Publication 1. FIG. 16 is a cross-sectional view of the detection element taken along the line 16-16. FIG. 17 is a cross-sectional view of the detection element taken along the line 17-17.

In FIG. 15 to FIG. 17, the conventional acceleration sensor includes: detection element 51 for detecting acceleration; and a processing circuit (not shown) for subjecting an acceleration signal outputted from detection element 51 to an arithmetic processing to detect acceleration. Detection element 51 has: support section 54 supporting weight section 52; and fixation section 58 connected to support section 54 via flexible section 56. By fixation section 58, detection element 51 is mounted on mounting substrate.

Flexible section 56 has an arm-like shape. Flexible sections 56 are provided to draw a cross shape having the center at support section 54. A pair of flexible sections 56 and support section 54 are provided on a single straight line.

Flexible section 56 has distortion resistance element 60. Based on a change in the status of flexible section 56 deflected due to the movability of weight section 52, a change in the resistance value of distortion resistance element 60 is outputted as an acceleration signal.

Next, the following section will describe the detection of acceleration using detection element 51.

In an X axis, a Y axis, and a Z axis orthogonal to one another, when arm-like flexible sections 56 forming a cross shape is provided in the X axis direction and the Y axis direction and when acceleration is generated in the X axis direction for example, this causes weight section 52 to move in the axial direction along which acceleration is generated. This causes weight section 52 to rotate around support section 54 in the Y axis direction and flexible section 56 is deflected. As a result, among flexible sections 56 provided in the X axis direction, one flexible section 56 is deflected in the positive direction of the Z axis and the other flexible section 56 is deflected in the negative direction of the Z axis. Then, two distortion resistance elements 60 provided in two flexible sections 56 are also deflected in the positive and negative directions of the Z axis in accordance with the deflection of flexible section 56, thus causing a change in the resistance value of distortion resistance element 60. This change in the resistance value is outputted as an acceleration signal to detect acceleration.

By designing the acceleration sensor as described above based on a detection axis along which acceleration is desired to be detected, the acceleration sensor is used for a posture control apparatus and a navigation apparatus of a movable body such as a vehicle.

In the case of the above conventional detection element however, when acceleration is generated in the X axis direction for example in FIG. 15, this causes weight section 52 to move around Y axis in X axis direction. However, the move of weight section 52 is limited by flexible section 56 provided in X axis direction. Specifically, although weight section 52 is caused to rotate around support section 54 in the Y axis and thus flexible section 56 is deflected, the limitation by flexible section 56 causes this deflection amount to be small and thus a change in the resistance value of distortion resistance element 60 is also small to thereby cause a low detection sensitivity, which is disadvantageous.

Next, an angular velocity sensor is generally structured so that a detection element of various shapes (e.g., tuning fork-like shape, H-like shape, or T-like shape) is caused to vibrate to electrically sense the distortion of the detection element due to the generation of Coriolis force to thereby detect an angular velocity.

For example, Patent Publication 2 discloses an angular velocity sensor that has an oscillator having a tuning fork-like shape. This angular velocity sensor is structured so that detection electrodes are provided at an inner side face and an outer side face of two tuning fork arms constituting the tuning fork oscillator and driving electrodes are provided at surfaces of both of the tuning fork arms.

This angular velocity sensor is structured so that a signal supplied to the driving electrodes from a driving power source gives resonant oscillation to the tuning fork oscillator. When an angular velocity is applied in this status, the tuning fork arms are deflected in a vertical direction to the vibration direction based on the Coriolis principle. As a result, the detection electrode outputs an angular velocity signal in accordance with the level of the deflection.

As in the acceleration sensor, the angular velocity sensor as described above is also used, in accordance with the detection axis along which a detection axis along which acceleration is desired to be detected, for a posture control apparatus and a navigation apparatus of a movable body such as a vehicle.

Conventionally, when the acceleration sensor and the angular velocity sensor as described above were installed in various electronic devices, an exclusive angular velocity sensor was used to detect an angular velocity and an exclusive acceleration sensor was used to detect acceleration.

Due to this reason, when both of an angular velocity and acceleration are to be detected in a combined manner in various electronic devices, a plurality of angular velocity sensors and acceleration sensors were mounted on the mounting substrate of the electronic device, respectively.

This conventional configuration has required, in accordance with the detection axes of an angular velocity and acceleration to be detected, angular velocity sensors and acceleration sensors to be mounted on the mounting substrate, which disadvantageously requires a large mounting area.

[Patent Publication 1] Japanese Patent Unexamined Publication No. H10-48243
[Patent Publication 2] Japanese Patent Unexamined Publication No. 2001-208546

SUMMARY OF THE INVENTION

The present invention solves the above disadvantages. The present invention provides an inertia force sensor having high detection sensitivity and a composite inertia force sensor for detecting an angular velocity and acceleration that can have a smaller mounting area to thereby have a smaller size.

The inertia force sensor of the present invention includes a detection element having an acceleration detection section. The detection element has a fixation section having a weight section via a connecting section, an opposed substrate opposed to the weight section, and opposed electrodes formed at the respective opposed face of the weight section and the opposed substrate. The acceleration detection section is structured so that a status change caused by movability of the weight section due to distortion of the connecting section is detected by the opposed electrode to thereby detect an inertia force. The connecting section has a thickness thinner than a thickness of the weight section.

By this configuration, the connecting section has a thickness thinner than a thickness of the weight section and thus the connecting section can be distorted easily to thereby increase the detection sensitivity of the inertia force.

Furthermore, the composite inertia force sensor of the present invention includes a detection element having an acceleration detection section and an angular velocity detection section. The detection element has two orthogonal arm sections obtained by connecting first arm sections to second arm sections so that the first arm sections are orthogonal to the second arm sections, a support section supporting the two first arm sections, weight sections connected to tip ends of the second arm sections, fixation sections connected to the first arm sections, an opposed substrate opposed to the weight sections, opposed electrodes formed at the respective opposed face of the weight sections and the opposed substrate, a driving electrode formed in the second arm section for outputting a driving signal for vibrating the second arm section, and a sensing electrode formed in the second arm section for sensing distortion of the second arm section to output a sensing signal. The acceleration detection section is structured so that a status change caused by movability of the weight sections due to distortion of the first arm is detected by the opposed electrodes to detect an inertia force. The angular velocity detection section is structured so that a status change due to a Coriolis force of the weight section is detected by the sensing electrode to thereby detect an angular velocity. The first arm section has a thickness thinner than a thickness of the second arm section.

By this configuration, one detection element has an acceleration detection section and an angular velocity detection section and the first arm section has a thickness thinner than a thickness of the second arm section. Thus, one detection element can detect both of acceleration and an angular velocity with a high sensitivity and thus the mounting area can be reduced and the resultant sensor can have a smaller size.

REFERENCE MARKS IN THE DRAWINGS

Figure 1:
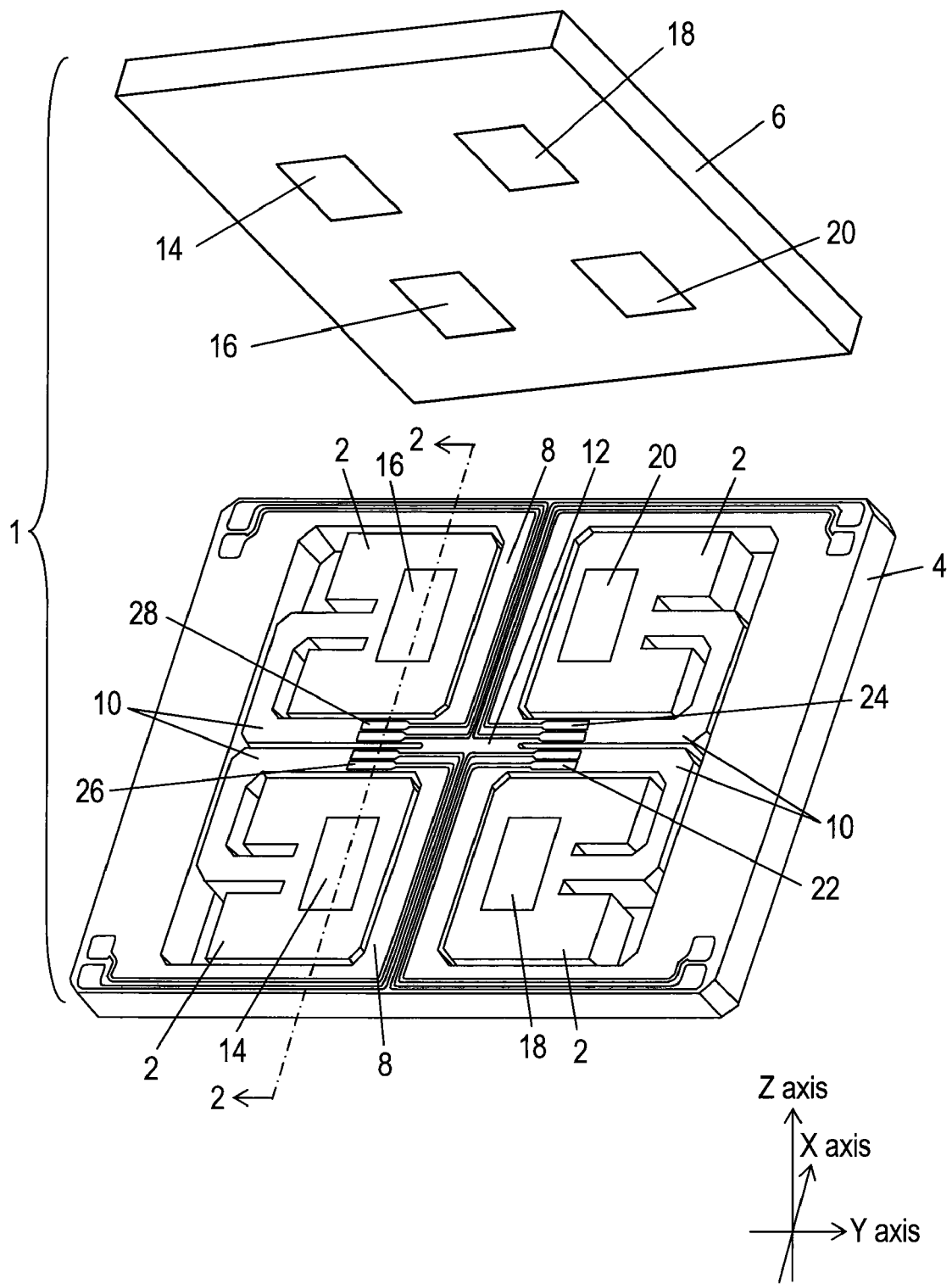
FIG. 1 is an exploded perspective view illustrating a detection element of a composite inertia force sensor in the first embodiment of the present invention.

1 Detection element
2 Weight section
4 Fixation section
6 Opposed substrate
7 Frame section
8 First arm
10 Second arm
11 Fixed arm
12 Support section
14 First opposed electrode
16 Second opposed electrode
18 Third opposed electrode
20 Fourth opposed electrode
22 Driving electrode
24 Sensing electrode
26 First sensing electrode
28 Second sensing electrode
30 Piezoelectric layer
32 Upper electrode
34 Lower electrode

DETAILED DESCRIPTION OF PREFERRED EMBODIMENTS

Hereinafter, the present invention will be described with reference to the drawings.

First Embodiment

Figure 2:
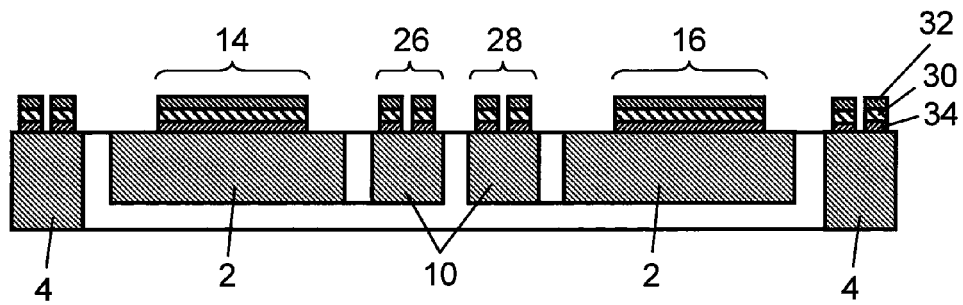
FIG. 2 is a cross-sectional view illustrating the detection element shown in FIG. 1 taken along the line 2-2.

FIG. 1 is an exploded perspective view illustrating a composite inertia force sensor in the first embodiment of the present invention. FIG. 2 is a cross-sectional view of FIG. 1 taken along the line 2-2.

In FIG. 1, a composite inertia force sensor in the first embodiment includes detection element 1 having an acceleration detection section and an angular velocity detection section. Detection element 1 has two orthogonal arms (orthogonal arm section) formed by connecting first arms 8 (first arm sections) to second arms 10 (second arm sections) in substantially orthogonal directions. Detection element 1 also has support sections 12 supporting one ends of two first arms 8 and square-shaped fixation section 4 to which the other ends of two first arms 8 are connected. Specifically, in the first embodiment, first arms 8 constitute a connecting section. The other ends of first arms 8 are fixed at side sections of fixation section 4. First arm 8 has a thickness much thinner than those of second arm 10 and weight section 2. Each of second arms 10 is bent to reach second arm 10 itself and the tip end of each of the bent second arms 10 is connected to weight section 2. First arms 8 and support section 12 are provided on substantially the same straight line. First arms 8 and second arms 10 are provided to be symmetrical with regard to the center of detection element 1 and detection element 1 has a symmetrical shape.

At the upper faces of weight sections 2, opposed substrate 6 is provided so as to be opposed to weight sections 2. Faces of weight sections 2 and opposed substrate 6 at which the former is opposed to the latter have, as an opposed electrode, first opposed electrodes 14, second opposed electrodes 16, third opposed electrodes 18, and fourth opposed electrodes 20.

The surfaces of one pair of two second arms 10 opposed to each other have driving electrode 22 for driving weight section 2 to vibrate and sensing electrode 24 for sensing the driving. The surfaces of the other pair of two second arms 10 opposed to each other have, as a sensing electrode, first sensing electrode 26 and second sensing electrode 28 for sensing the distortion of second arm 10.

As shown in FIG. 2, each of first opposed electrode 14, second opposed electrode 16, third opposed electrode 18, fourth opposed electrode 20, driving electrode 22, sensing electrode 24, first sensing electrode 26, and second sensing electrode 28 has upper electrode 32 and lower electrode 34 sandwiching piezoelectric layer 30.

The detection element of the composite inertia force sensor of the first embodiment having the configuration as described above is structured so that the side sections of fixation section 4 to which the other ends of first arm 8 are connected are fixed to a mounting substrate (not shown).

Next, the angular velocity detection section and the acceleration detection section will be described. First, the angular velocity detection section will be described.

Figure 3:
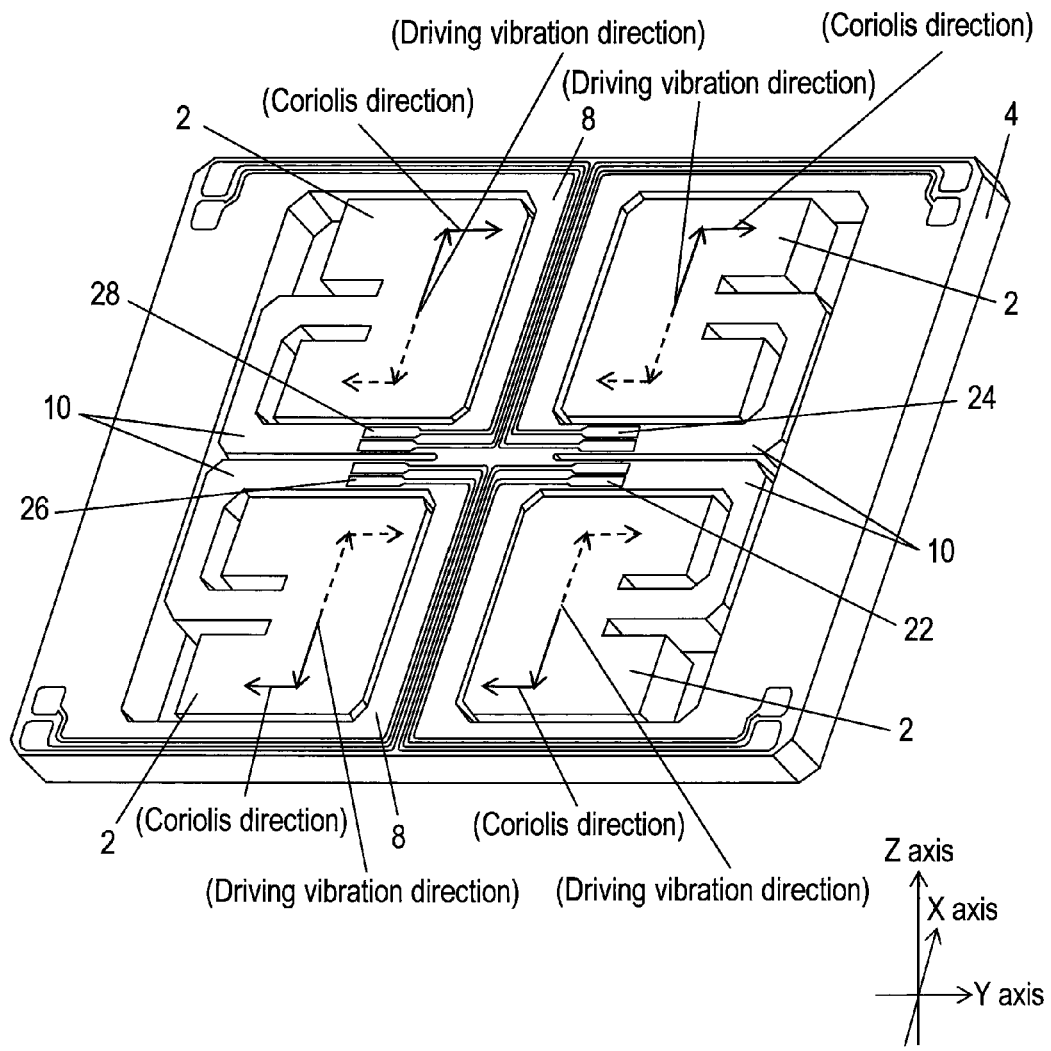
FIG. 3 is a perspective view illustrating the detection element in the embodiment before a substrate is provided.

FIG. 3 is a perspective view illustrating detection element 1 in the first embodiment before opposed substrate 6 is provided. The following section will describe a case where when first arms 8 of detection element 1 are provided in the X axis direction and second arms 10 are provided in the Y axis direction in the X axis, Y axis, Z axis orthogonal to one another as shown in FIG. 3. When driving electrode 22 receives an alternating voltage of a resonance frequency, then the vibration of second arm 10 by the driving by driving electrode 22 is started from support section 12 of second arm 10 at which driving electrode 22 is provided. In accordance with this, weight section 2 is also driven to vibrate in a direction along which second arms 10 are opposed (the driving vibration directions shown by the solid-line arrows and the dotted-line arrows). At the same time, all of four second arms 10 and four weight sections 2 are driven to vibrate in a synchronized manner in the direction along which second arms 10 are opposed. Specifically, the driving vibration direction in detection element 1 is the X axis direction.

When an angular velocity is generated in a counterclockwise direction of the Z axis for example, this angular velocity is synchronized with the driving vibration of weight section 2 to cause a Coriolis force to weight section 2 in a direction orthogonal to the driving vibration direction (Coriolis direction shown by the solid-line arrow and the dotted-line arrow (Y axis direction)). Thus, second arm 10 can be distorted due to the angular velocity in a counterclockwise direction of Z axis. Specifically, based on this status change of second arm 10 deflected due to the Coriolis force (distortion generated in second arm 10), voltages are outputted from first sensing electrode 26 and second sensing electrode 28 and an angular velocity is detected based on the outputted voltages.

Next, the acceleration detection section will be described.

Figure 4:
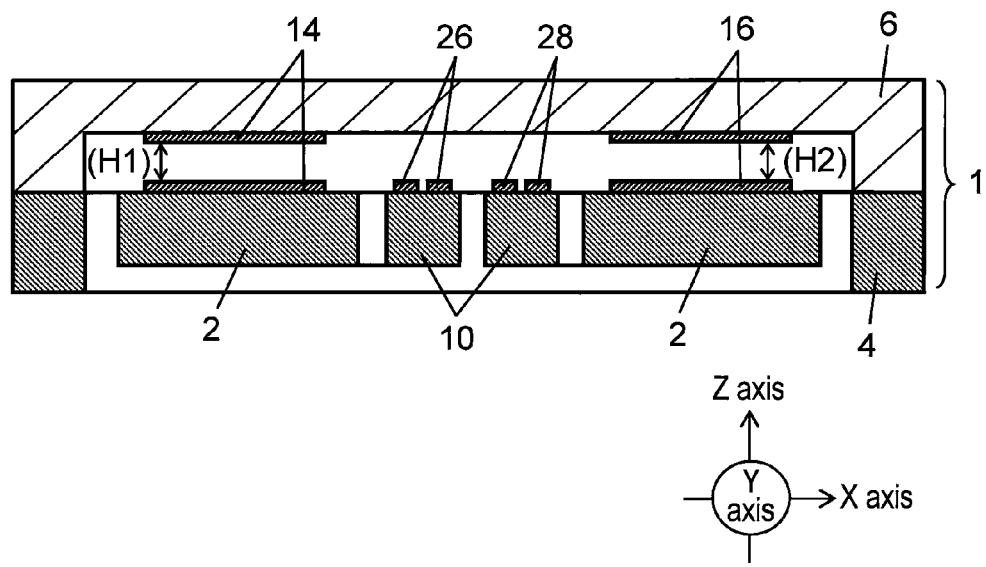
FIG. 4 is a cross-sectional view illustrating the detection element shown in FIG. 3.

FIG. 4 is a cross-sectional view illustrating a detection element in the first embodiment. As shown in FIG. 4, the following section will describe a case where opposed substrate 6 is provided in an XY plane in the X axis, Y axis, and Z axis orthogonal to one another. When no acceleration is generated, opposing distance (H1) between first opposed electrodes 14 at faces at which opposed substrate 6 and weight sections 2 are opposed to each other is equal to opposing distance (H2) between second opposed electrodes 16 at faces at which opposed substrate 6 and weight sections 2 are opposed to each other. Although not shown, the opposing distance of third opposed electrodes 18 is also equal to the opposing distance of fourth opposed electrodes 20.

Figure 5:
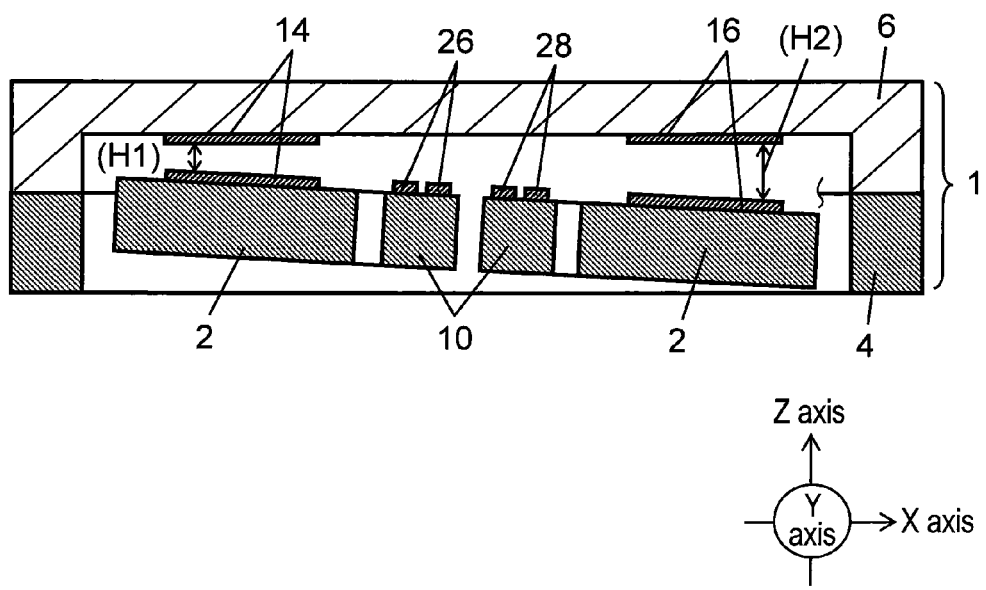
FIG. 5 illustrates how the detection element operates when acceleration is generated in the embodiment.

When acceleration is generated in the X axis direction for example, as schematically shown in FIG. 5, this consequently causes weight section 2 to rotate around support section 12 in the Y axis direction. This consequently causes a decrease in opposing distance (H1) between first opposed electrodes 14 at faces at which opposed substrate 6 and weight sections 2 are opposed to each other and an increase in the opposing distance (H2) between second opposed electrodes 16 at faces at which opposed substrate 6 and weight sections 2 are opposed to each other. Although not shown, this also consequently causes a decrease in the opposing distance of third opposed electrodes 18 and an increase in the opposing distance of fourth opposed electrodes 20.

When acceleration is generated in the Y axis direction on the other hand, this also consequently causes weight section 2 to rotate around support section 12 in the X axis direction. This consequently causes an increase in the opposing distances of third opposed electrodes 18 and fourth opposed electrodes 20 and a decrease in the opposing distances of first opposed electrodes 14 and second opposed electrodes 16 for example.

Specifically, since the capacitances between the respective opposed electrodes change, acceleration in the X axis direction or the Y axis direction is detected based on a change in this capacitance.

By the above configuration, in the first embodiment, the acceleration detection section detects acceleration by detecting the status change due to movability of weight section 2 in thickness direction by distortion of first arm 8 as a capacitance change between opposed electrodes. The angular velocity detection section also detects an angular velocity by detecting a status change due to the Coriolis force. Specifically, since detection element 1 can detect both of acceleration and an angular velocity, a smaller mounting area can be required and thus a smaller size is required.

In particular, when first arm 8 is provided in the X axis direction and second arm 10 is provided in the Y axis direction in the X axis, Y axis, and Z axis orthogonal to one another in particular, acceleration in the X axis direction for example is detected so that weight section 2 is caused to rotate around support section 12 in the Y axis direction. In this case, the first arm 8 having a thickness thinner than that of second arm 10 allows weight section 2 to rotate in the Y axis more easily and thus the acceleration detection sensitivity can be improved.

As described above, an angular velocity is detected by sensing the distortion of second arm 10 due to the Coriolis force while second arm 10 being driven to vibrate. During this detection, the other ends of first arms 8 are fixed to the mounting substrate and first arm 8 and second arm 10 are symmetrically arranged around the center of detection element 1. This can suppress unnecessary vibration when second arm 10 is driven to vibrate, thus improving the detection accuracy of an angular velocity.

Figure 6:
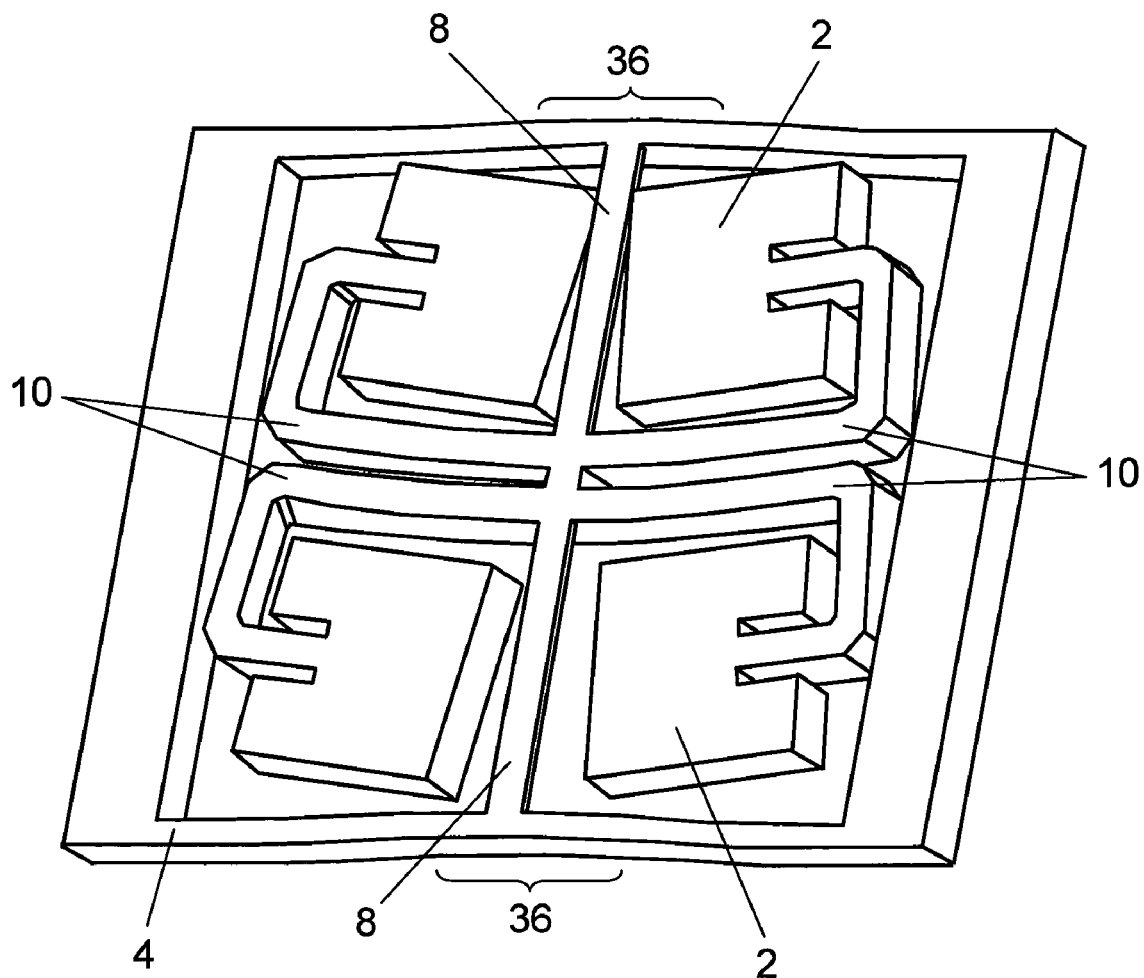
FIG. 6 illustrates a distortion at a connecting part of the first arm of the detection element and a fixation section in the embodiment.

When the other ends of first arm 8 are connected to fixation section 4 of a square-shaped frame body for example, the side sections of fixation section 4 to which the other ends of first arm 8 are connected may be fixed to the mounting substrate to thereby achieve a secure fixing at the mounting substrate. Furthermore, the side sections of fixation section 4 fixed to the mounting substrate as shown in FIG. 6 can suppress the distortion as shown in FIG. 6 that is easily caused in the vicinity of connecting part 36, thus improving the detection accuracy.

Although the side sections of fixation section 4 were fixed to mounting substrate in the first embodiment, the other ends of first arm 8 also may be fixed to the mounting substrate. Furthermore, the movability of weight section 2 can be detected even when second arm 10 is not bent.

Although first arm 8 had a thickness thinner than those of second arm 10 and weight section 2 in the first embodiment, the present invention also can improve the detection sensitivity even when first arm 8 as a connecting section has a thickness thinner than that of weight section 2.

Second Embodiment

Figure 7:
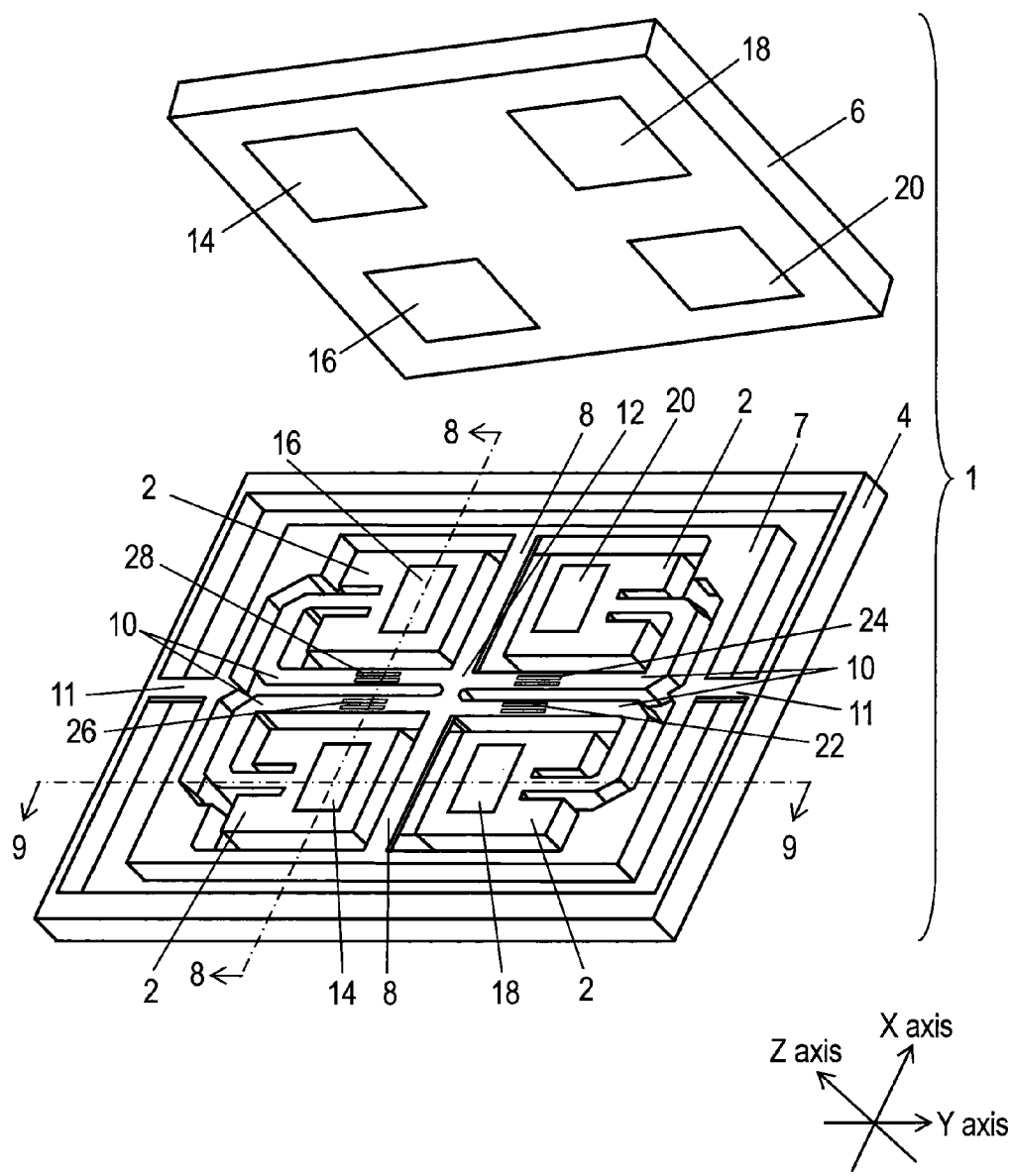
FIG. 7 is an exploded perspective view illustrating a detection element of a composite sensor in the second embodiment of the present invention.
Figure 8:
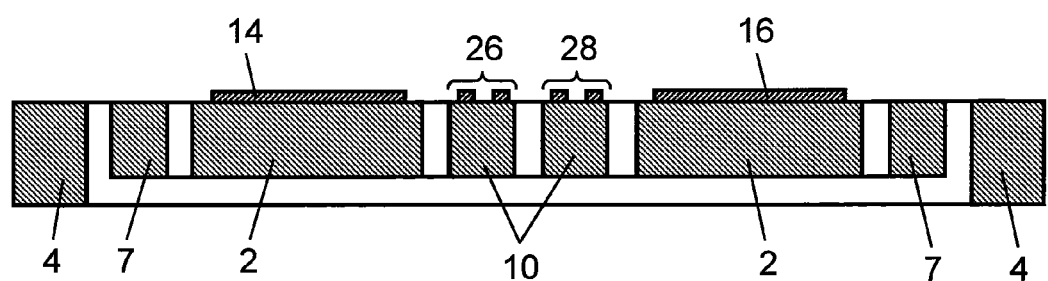
FIG. 8 is a cross-sectional view illustrating the detection element shown in FIG. 7 taken along the line 8-8.
Figure 9:
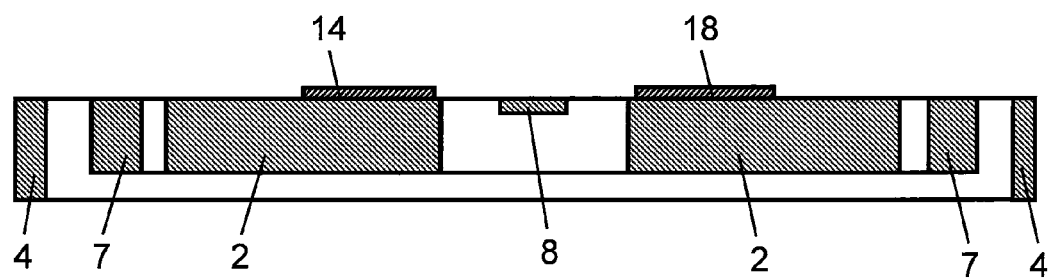
FIG. 9 is a cross-sectional view illustrating the detection element shown in FIG. 7 taken along the line 9-9.

FIG. 7 is an exploded perspective view illustrating a detection element of a composite inertia force sensor in the second embodiment of the present invention. FIG. 8 is a cross-sectional view taken along the line 8-8 in FIG. 7. FIG. 9 is a cross-sectional view taken along the line 9-9 in FIG. 7.

In FIG. 7 to FIG. 9, the composite inertia force sensor in the second embodiment includes, as in the first embodiment, detection element 1 having the acceleration detection section and the angular velocity detection section. Detection element 1 has frame section 7 having a frame-like shape that is connected to weight sections 2 via the first connecting section (which will be described later) and that includes therein weight sections 2. Detection element 1 also has opposed substrate 6 opposed to upper faces of weight sections 2 and fixation section 4 having a frame-like shape that is connected to frame section 7 via the second connecting section (which will be described later), that includes therein weight sections 2, and that is used for the fixing to the mounting substrate.

Specifically, detection element 1 has two orthogonal arms obtained by connecting first arms 8 to second arms 10 in substantially orthogonal directions. One ends of two first arms 8 are supported by support section 12 and the other ends of two first arms 8 are connected to frame section 7. Second arms 10 are bent to draw a U-like shape until being opposed to second arms 10 themselves and the respective tip ends of the bent second arms 10 are connected to weight sections 2. First arm 8 and support section 12 are provided on substantially the same straight line. First arms 8 and second arms 10 are provided to be symmetrical with regard to the center of detection element 1 and detection element 1 has a symmetrical shape.

Frame section 7 is connected to a side section of fixation section 4 via fixed arms 11 and this side section is fixed to a mounting substrate (not shown). As described above, in the second embodiment, first arm 8 corresponds to the first connecting section and fixed arm 11 corresponds to the second connecting section. First arm 8 and fixed arm 11 have a thickness much thinner than those of second arm 10 and weight section 2 and first arm 8 are provided to be orthogonal to each other.

Furthermore, opposed substrate 6 is provided so as to be opposed to weight sections 2. The respective opposed faces of weight sections 2 and opposed substrate 6 have first opposed electrodes 14, second opposed electrodes 16, third opposed electrodes 18, and fourth opposed electrodes 20. Furthermore, surfaces of one pair of two second arm 10 opposed to each other have driving electrode 22 for driving weight sections 2 to vibrate and sensing electrode 24 for sensing the driving. Surfaces the other pair of two second arms 10 opposed to each other have first sensing electrode 26 and second sensing electrode 28 for sensing the distortion of second arm 10. Among these electrodes, at least driving electrode 22, sensing electrode 24, first sensing electrode 26, and second sensing electrode 28 have upper electrode 32 and lower electrode 34 sandwiching piezoelectric layer 30 as shown in FIG. 2.

Signal wires (not shown) are drawn from first opposed electrode 14, second opposed electrode 1614, third opposed electrode 18, fourth opposed electrode 20, driving electrode 22, sensing electrode 24, first sensing electrode 26, and second sensing electrode 28 to frame section 7 and further to support section 4. The respective electrodes are electrically connected to a wiring pattern of a mounting substrate at ends of the signal wires via wire bonding for example.

Next, the angular velocity detection section and the acceleration detection section will be described.

Figure 10:
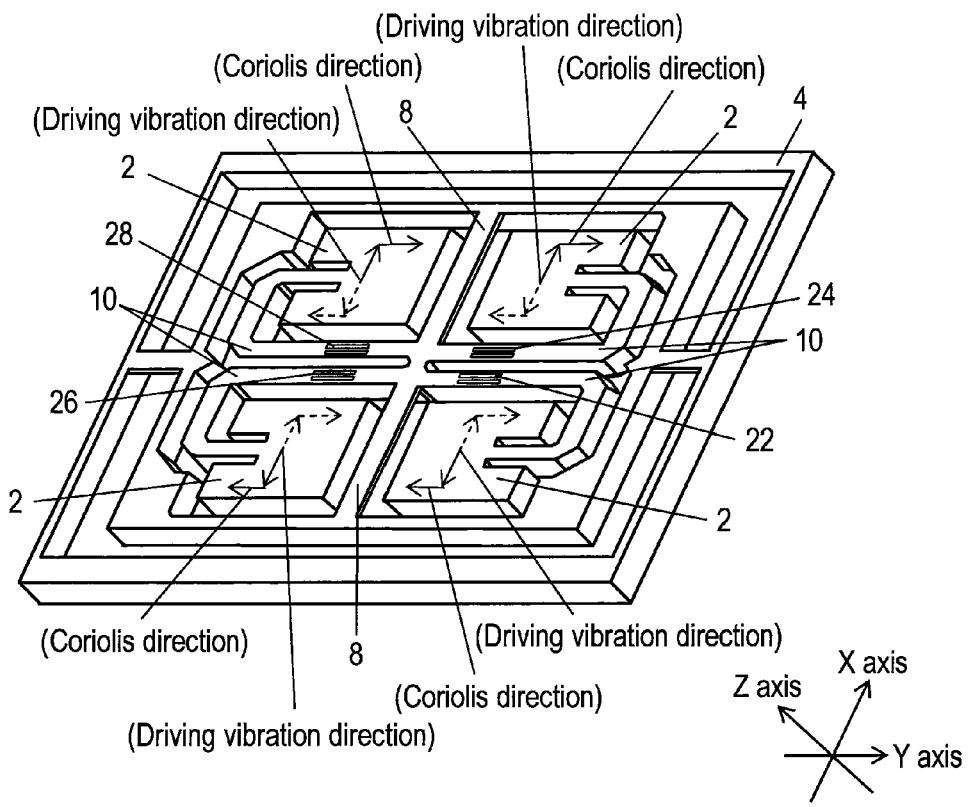
FIG. 10 illustrates an operation status when an angular velocity is detected in the embodiment.

First, the angular velocity detection section will be described. The following case will describe a case where first arm 8 of detection element 1 is placed in the X axis direction and second arm 10 is placed in the Y axis direction in the X axis, Y axis, and Z axis orthogonal to one another as shown in FIG. 10. When driving electrode 22 receives an alternating voltage of a resonance frequency, then the vibration of second arm 10 by the driving by driving electrode 22 is started from second arm 10 at which driving electrode 22 is provided. In accordance with this, weight sections 2 are also driven to vibrate in a direction along which second arms 10 are opposed (the driving vibration directions shown by the solid-line arrows and the dotted-line arrows). At the same time, all of four second arms 10 and four weight sections 2 are driven to vibrate in a synchronized manner in the direction along which second arms 10 are opposed. Specifically, the driving vibration direction in detection element 1 is the X axis direction.

When an angular velocity is generated in a counterclockwise direction of the Z axis for example, this angular velocity is synchronized with the driving vibration of weight section 2 to cause the Coriolis force to weight section 2 in a direction orthogonal to the driving vibration direction (Coriolis direction shown by the solid-line arrow and the dotted-line arrow (Y axis direction)). Thus, second arm 10 can be distorted due to the angular velocity in a counterclockwise direction of Z axis. Specifically, based on this status change of second arm 10 deflected due to the Coriolis force (distortion generated in second arm 10), voltages are outputted from first sensing electrode 26 and second sensing electrode 28 and an angular velocity is detected based on the outputted voltages.

Next, the acceleration detection section will be described.

Figure 11:
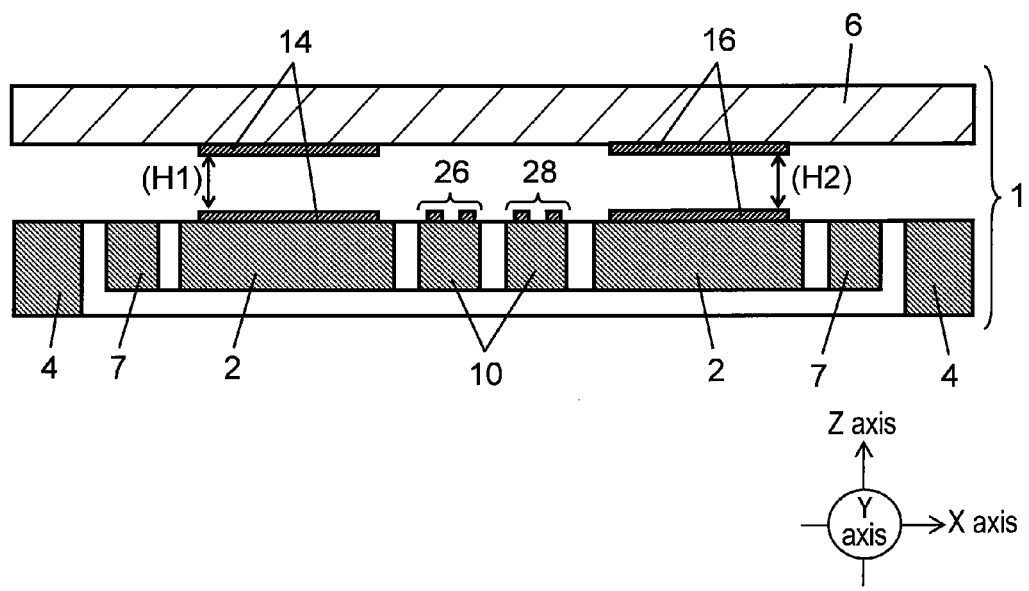
FIG. 11 is a cross-sectional view as in FIG. 8 illustrating how an opposed substrate of the detection element is provided in the embodiment.

First, acceleration in the X axis direction will be described. The following section will describe a case where opposed substrate 6 is provided in an XY plane in the X axis, Y axis, and Z axis orthogonal to one another as shown in FIG. 7 and FIG. 11. When no acceleration is generated, opposing distance (H1) between first opposed electrodes 14 at faces at which opposed substrate 6 and weight sections 2 are opposed to each other is equal to opposing distance (H2) between second opposed electrodes 16 at faces at which opposed substrate 6 and weight sections 2 are opposed to each other. Although not shown, the opposing distance of third opposed electrodes 18 is also equal to the opposing distance of fourth opposed electrodes 20.

Figure 12:
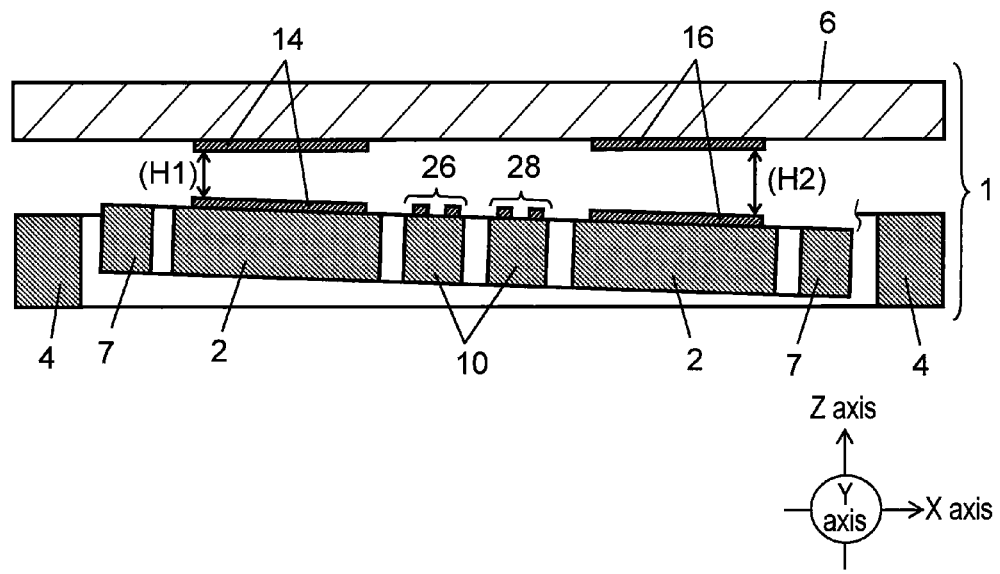
FIG. 12 illustrates an operation status of the detection element in the embodiment when acceleration in the X axis direction is detected.

When acceleration is generated in the X axis direction for example, this consequently causes weight section 2 to rotate around fixed arm 11 provided in the Y axis direction as shown in FIG. 7 and FIG. 12. This consequently causes a decrease in opposing distance (H1) between first opposed electrodes 14 at faces at which opposed substrate 6 and weight sections 2 are opposed to each other and an increase in opposing distance (H2) between second opposed electrodes 16 at faces at which opposed substrate 6 and weight sections 2 are opposed to each other. This also causes a decrease in the opposing distance of third opposed electrodes 18 and an increase in the opposing distance of fourth opposed electrodes 20.

Figure 13:
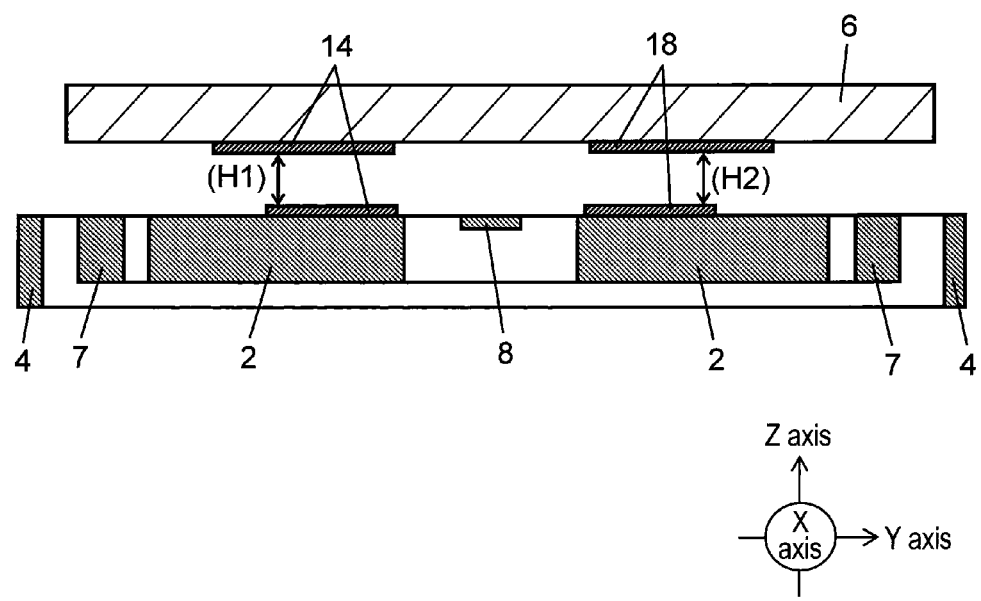
FIG. 13 is a cross-sectional view as in FIG. 9 illustrating how the opposed substrate of the detection element is provided in the embodiment.

Next, acceleration in the Y axis direction will be described. The following section will describe a case where opposed substrate 6 is provided in an XY plane in the X axis, Y axis, and Z axis orthogonal to one another as shown in FIG. 7 and FIG. 13 will be described. When no acceleration is generated, opposing distance (H1) between first opposed electrodes 14 at faces at which opposed substrate 6 and weight sections 2 are opposed to each other is equal to opposing distance (H2) between third opposed electrodes 18 at faces at which opposed substrate 6 and weight sections 2 are opposed to each other. Although not shown, the opposing distance of second opposed electrodes 16 is also equal to the opposing distance of fourth opposed electrodes 20.

Figure 14:
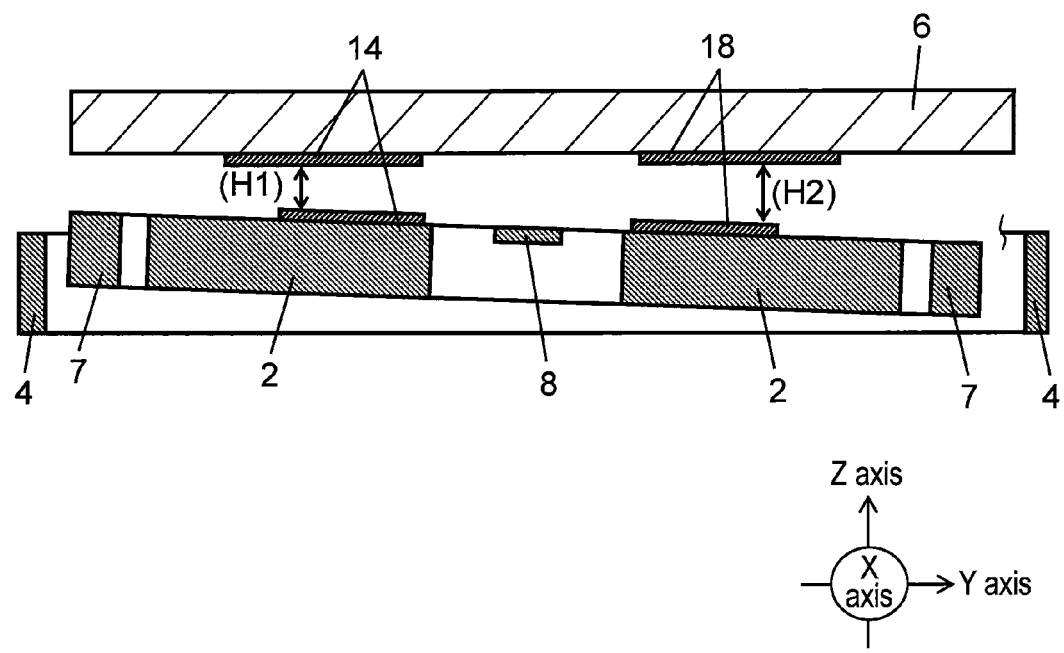
FIG. 14 illustrates an operation status of the detection element in the embodiment when acceleration in the Y axis direction is detected.
Figure 15:
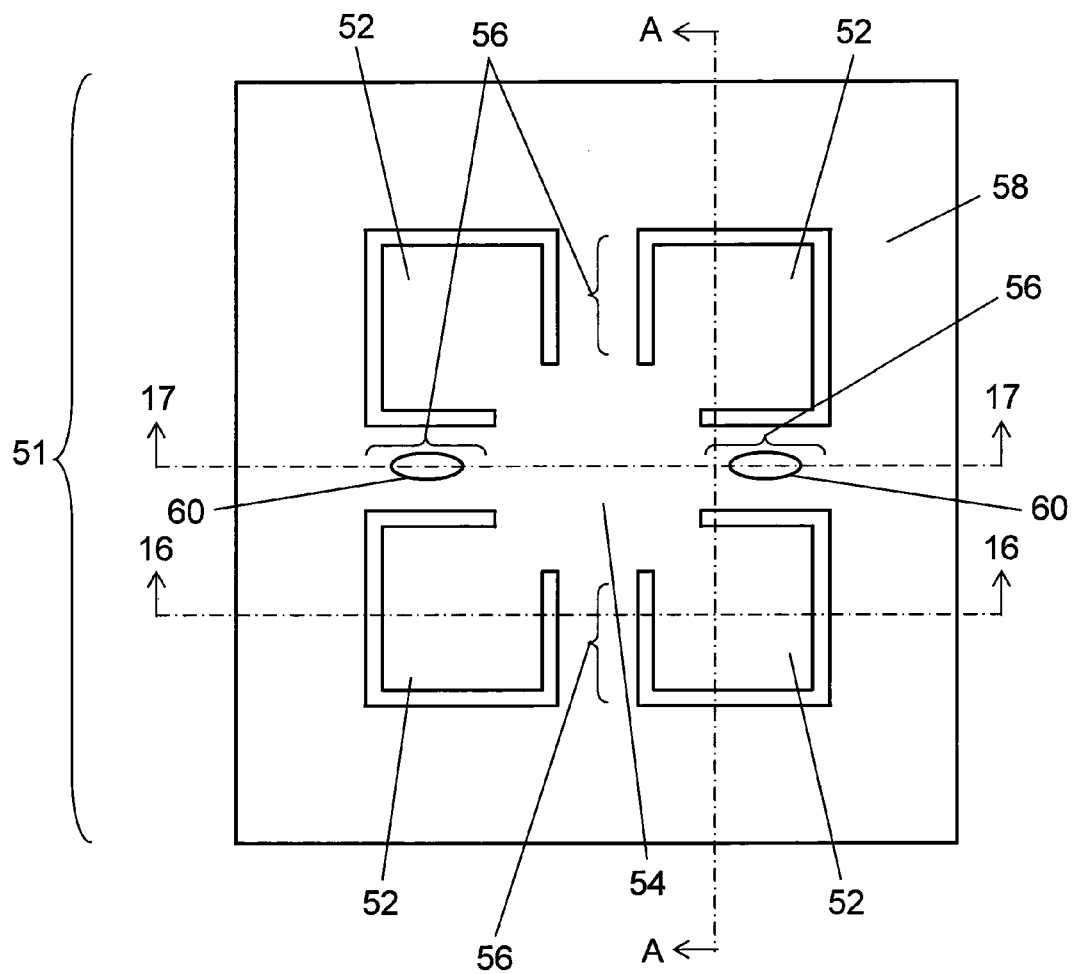
FIG. 15 is a top view illustrating a detection element of a conventional acceleration sensor.
Figure 15:
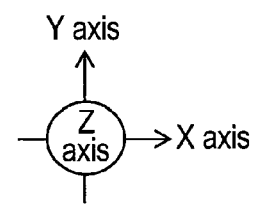
Figure 16:
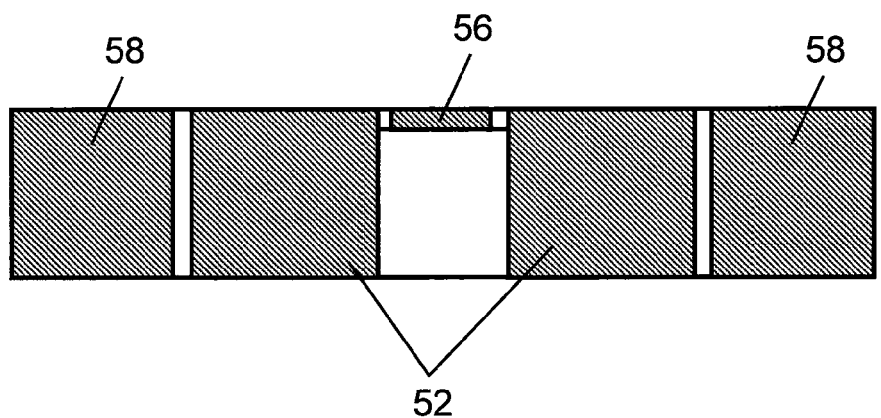
FIG. 16 is a cross-sectional view illustrating the detection element shown in FIG. 15 taken along the line 16-16.
Figure 17:
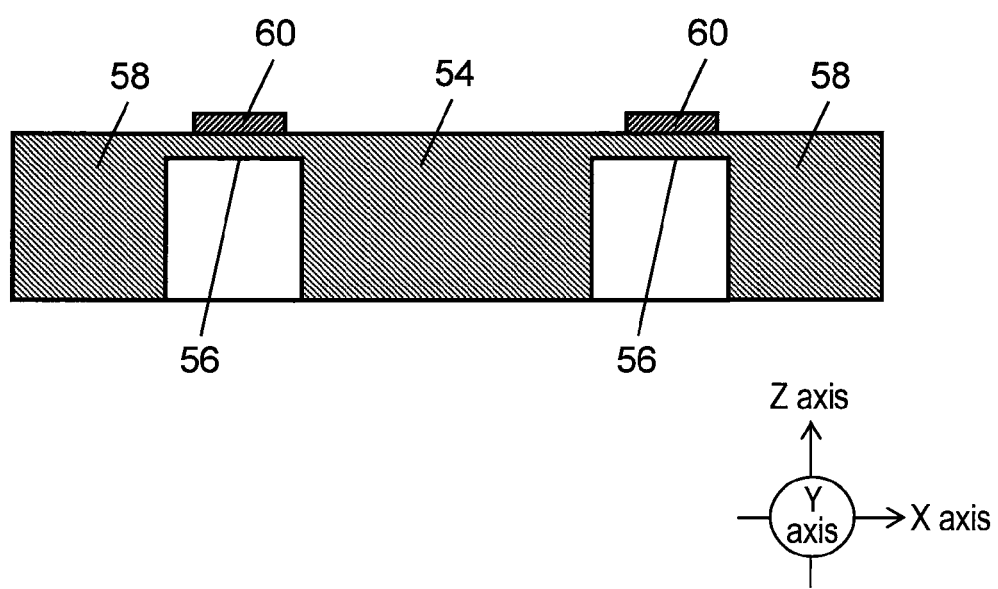
FIG. 17 is a cross-sectional view illustrating the detection element shown in FIG. 15 taken along the line 17-17.

When acceleration is generated in the Y axis direction, this consequently causes weight section 2 to rotate around first arm 8 of the first connecting section provided in the X axis direction as shown in FIG. 7 and FIG. 14. This consequently causes, for example, an increase in the opposing distance of third opposed electrodes 18 and fourth opposed electrode 20 and a decrease in the opposing distances of first opposed electrodes 14 and second opposed electrodes 16.

Specifically, capacitance between the respective electrodes changes and, based on this capacitance change, acceleration is detected in the X axis direction or the Y axis direction.

By the above configuration, the acceleration detection section detects the capacitances of first opposed electrodes 14, second opposed electrodes 16, third opposed electrodes 18, and fourth opposed electrodes 20 provided at the respective opposed face at which weight sections 2 are opposed to opposed substrate 6 to thereby detect acceleration. Furthermore, the angular velocity detection section is used to allow first sensing electrode 26 and second sensing electrode 28 to detect a status change of the flexible section deflected due to the Coriolis force and detection element 1 can detect both of acceleration and an angular velocity. Thus, a mounting area required for two detection sections can be reduced to thereby achieve a smaller size.

Furthermore, when the first connecting section configured by first arms 8 is provided in the X axis direction and the second connecting section configured by fixed arms 11 is provided in the Y axis direction in the X axis, Y axis, and Z axis orthogonal to one another for example, acceleration generated in the Y axis direction causes weight section 2 to rotate around the first connecting section as a center axis in the X axis direction, thus causing a change in the capacitance between opposed electrodes of weight section 2 and opposed substrate 6. The reason why weight section 2 rotates in the X axis direction is that the first connecting section has a thickness thinner than that of weight section 2 and thus a barycentric position of the weight section in the Z axis direction is dislocated from a barycentric position of the first connecting section and the center of gravity weight section 2 is caused to rotate around the first connecting section to thereby cause a twist of the first connecting section. This twist of the first connecting section easily occurs when acceleration is generated. Thus, a capacitance change between opposed electrodes also easily occurs and thus the detection sensitivity can be improved.

When acceleration is generated in the X axis direction, this consequently causes weight section 2 to be rotated in Y axis direction around the second connecting section as a center axis provided in a direction orthogonal to the first connecting section. This causes a capacitance change between weight section 2 and opposed electrodes of opposed substrate 6. As in the above, the reason why weight section 2 rotates in the Y axis direction is that the second connecting section has a thickness thinner than that of weight section 2 and thus the barycentric position of weight section 2 in the Z axis direction is displaced from the barycentric position of the second connecting section and the center of gravity of weight section 2 is caused to rotate around the second connecting section to thereby cause a twist of the second connecting section. This twist of the second connecting section easily occurs when acceleration is generated. Thus, a capacitance change between opposed electrodes also easily occurs and thus the detection sensitivity can be improved.

In particular, when accelerations in the X axis direction and the Y axis direction is detected, the acceleration in Y axis direction is detected so that weight section 2 is caused to rotate around the first connecting section as a center axis in the X axis direction and the acceleration in X axis direction is detected so that weight section 2 is caused to rotate around the second connecting section as a center axis in the Y axis direction. Specifically, these accelerations can be detected independently and thus a decrease of the detection accuracy can be suppressed.

Although the second embodiment has provided the first connecting section to be orthogonal to the second connecting section, the same effect also can be obtained even when the first connecting section is not orthogonal to the second connecting section orthogonal.

Although the second embodiment has caused second arm 10 to be bent, the present invention is not limited to this.

Furthermore, although the second embodiment has provided the first connecting section to be orthogonal to the second connecting section, the present invention is not limited to this.

INDUSTRIAL APPLICABILITY

The inertia force sensor and the composite inertia force sensor of the present invention can increase the mounting density and can improve the detection sensitivity. Thus, the inertia force sensor and the composite inertia force sensor of the present invention can be used for various electronic devices for the control and navigation of a movable body.

The invention claimed is:

1. An inertia force sensor comprising a detection element having an acceleration detection section, the detection element has a fixation section having a weight section via a connecting section, an opposed substrate opposed to the weight section, and opposed electrodes formed at the respective opposed face of the weight section and the opposed substrate, the acceleration detection section is structured so that a status change caused by movability of the weight section due to distortion of the connecting section is detected by the opposed electrode to thereby detect an inertia force, wherein:

the connecting section has a thickness thinner than a thickness of the weight section, and the detection element has two orthogonal arm sections obtained by connecting first arm sections to second arm sections so that the first arm sections are orthogonal to the second arm sections and a support section supporting the two first arm sections, a tip end of the second arm section has the weight section, the connecting section is configured by the first arm section, and the first arm section has a thickness thinner than a thickness of the second arm section.

2. The inertia force sensor according to claim 1, wherein: the second arm section is bent so that the tip end thereof is opposed to the second arm section.

3. The inertia force sensor according to claim 1, wherein: the weight section and the fixation section have therebetween a frame section including therein the weight section, the frame section is connected to the weight section via the first connecting section, the fixation section is connected to the frame section and the second connecting section so as to include therein the weight section, and the first connecting section and the second connecting section have thicknesses thinner than a thickness of the weight section.

4. The inertia force sensor according to claim 3, wherein: the first connecting section and the second connecting section are provided so as to be orthogonal to each other.

5. The inertia force sensor according to claim 1, wherein: the fixation section has a square-like shape including therein the weight section, the connecting section is connected to a side section of the square-shaped fixation section, and the side section is fixed to a mounting substrate.

6. The inertia force sensor according to claim 1, wherein: the detection element has a symmetrical shape.

7. An inertia force sensor including a detection element having an acceleration detection section and an angular velocity detection section, the detection element has two orthogonal arm sections obtained by connecting first arm sections to second arm sections so that the first arm sections are orthogonal to the second arm sections, a support section supporting the two first arm sections, weight sections connected to tip ends of the second arm sections, fixation sections connected to the first arm sections, an opposed substrate opposed to the weight sections, opposed electrodes formed at the respective opposed face of the weight sections and the opposed substrate, a driving electrode formed in the second arm section for outputting a driving signal for vibrating the second arm section, and a sensing electrode formed in the second arm section for sensing distortion of the second arm section to output a sensing signal, the inertia force detection section is structured so that a status change caused by movability of the weight sections due to distortion of the first arm is detected by the opposed electrodes to detect an inertia force, and the angular velocity detection section is structured so that a status change due to a Coriolis force of the weight section is detected by the sensing electrode to thereby detect an angular velocity, wherein:

the first arm section has a thickness thinner than a thickness of the second arm section.

8. The composite inertia force sensor according to claim 7, wherein:

the second arm section is bent so that the tip end thereof is opposed to the second arm section.

9. The composite inertia force sensor according to claim 7, wherein:

the weight section and the fixation section have therebetween a frame section including therein the weight section, the frame section is connected to the second arm section via a first connecting section configured by the first arm section, the fixation section is connected to the frame section by a second connecting section, the first connecting section and the second connecting section have thicknesses thinner than a thickness of the weight section.

10. The composite inertia force sensor according to claim 9, wherein:

the first connecting section and the second connecting section are provided so as to be orthogonal to each other.

11. The composite inertia force sensor according to claim 7, wherein:

the fixation section has a square-like shape including therein the weight section, the first arm section is connected to a side section of the square-shaped fixation section, and the side section is fixed to a mounting substrate.

12. The composite inertia force sensor according to claim 7, wherein:

the detection element has a symmetrical shape.

* * * * *